United States Patent
Wang et al.

(10) Patent No.: US 8,225,677 B2
(45) Date of Patent: Jul. 24, 2012

(54) CAPACITIVE SENSOR, SYSTEM, AND METHOD FOR MEASURING PARAMETERS OF A TWO-PHASE FLOW

(75) Inventors: Yutao Wang, Shenyang (CN); Gang Yang, Shenyang (CN); Zengxi Lu, Shenyang (CN)

(73) Assignee: Northeastern University, Shenyang, Liaoning Province (CN)

( * ) Notice: Subject to any disclaimer, the term of this patent is extended or adjusted under 35 U.S.C. 154(b) by 290 days.

(21) Appl. No.: 12/614,340

(22) Filed: Nov. 6, 2009

(65) Prior Publication Data

US 2010/0107775 A1  May 6, 2010

(30) Foreign Application Priority Data

Nov. 6, 2008 (CN) ............ 2008 1 0172618
Nov. 6, 2008 (CN) ............ 2008 1 0172619

(51) Int. Cl.
*G01F 1/56* (2006.01)
*G01F 1/74* (2006.01)
(52) U.S. Cl. .................. 73/861.08; 73/861.04
(58) Field of Classification Search .......... None
See application file for complete search history.

(56) References Cited

U.S. PATENT DOCUMENTS

| | | | | |
|---|---|---|---|---|
| 5,022,274 A | * | 6/1991 | Klinzing et al. | 73/861.04 |
| 5,291,791 A | * | 3/1994 | Lucas et al. | 73/861.08 |
| 5,719,340 A | * | 2/1998 | Poortmann et al. | 73/861.08 |
| 5,864,239 A | * | 1/1999 | Adams et al. | 324/636 |
| 5,929,343 A | * | 7/1999 | Yamamoto et al. | 73/861.08 |
| 6,532,824 B1 | * | 3/2003 | Ueno et al. | 73/780 |

OTHER PUBLICATIONS

G. I. Taylor, "The Spectrum of Turbulence", Proceedings of the Royal Society of London. Series A, Mathematical and Physical Sciences, vol. 164, No. 919 (Feb. 18, 1938), pp. 476-490.

A. Bahraminasab et al., "Taylor's Frozen-Flow Hypothesis in Burgers Turbulence", Physical Review 77, 065302(R) (2008).

Darryl D. Holm, "Taylor's Hypothesis, Hamilton's Principle, and the LANS-Alpha Model for Computing Turbulence", Los Alamos Science, No. 29 (2005).

* cited by examiner

*Primary Examiner* — Harshad Patel
(74) *Attorney, Agent, or Firm* — Patrick J. S. Inouye; Krista A. Wittman (57) ABSTRACT

A capacitive sensor for measuring flow parameters of a two-phase flow, a device for measuring phase concentration of a two-phase flow, and a system and method for measuring flow parameters of a two-phase flow is disclosed. In the capacitive sensor, at least one pair of electrodes is twisted by 180° in a common direction into a spiral shape. Edge guard electrodes are twisted in the common direction and are formed between adjacent electrode edges. Problems of non-homogeneous sensitivity distribution of a measuring field and soft field effect can be effectively addressed, thereby allowing reliable and accurate measurement of phase concentration of a two-phase flow. The system for measuring flow parameters of the two-phase flow can output signals with a current of 4~20 mA to a PLC system or communicate with an industrial process control computer or with a remote control computer system in a operating room.

18 Claims, 5 Drawing Sheets

CAPACITIVE SENSOR, SYSTEM, AND METHOD FOR MEASURING PARAMETERS OF A TWO-PHASE FLOW

CROSS-REFERENCE TO RELATED APPLICATIONS

This patent application claims priority to Chinese patent application No. 200810172619.5, filed on Nov. 6, 2008, and Chinese patent application No. 200810172618.0, filed on Nov. 6, 2008, the disclosures of which are incorporated by reference.

FIELD OF THE INVENTION

This application relates to measurement of flow parameters of a two-phase flow, and more particularly, to a capacitive sensor for measuring flow parameters of a gas-solid two-phase flow, a device for measuring phase concentration and velocity of a two-phase flow, and a system and method for measuring flow parameters of a two-phase flow.

BACKGROUND OF THE INVENTION

Two-phase flows, such as gas-solid two-phase flows, are widely applied in production practices of industries, such as electrical, metallurgical and pharmaceutical industries. For example, in the fields of electrical and metallurgical industries, pneumatic conveying of pulverized coal is a typical gas-solid two-phase flow, which can increase combustion efficiency, improve production environment and reduce labor intensity. Thus, the pneumatic conveying of pulverized coal facilitates a solution to the problems, such as an increase in waste of coal combustion as an energy source and deterioration of the environment.

In the electrical industry, an appropriate ratio of coal distribution to combustion-supporting air is one of the essential conditions for optimizing combustion of large scale fired boilers. For a coal-fired boiler, inconsistent coal dust flows in a pipeline among a combustor will influence the air-to-coal ratio of the combustor, resulting in a lowered combustion rate, increased level of unburned carbon and high NOx emission, as well as clogged primary air ducts, accidental fires, and even local clogging of the coke in severe cases.

In the metallurgical industry, pulverized coal injection is a significant technical method of reducing costs and improving product quality in iron making. In the case of an uneven coal distribution among different tuyeres, the combustion cannot be well organized. In the case of a clogged injection pipe, the clogging may lead to an overflow of pulverized coal from the tuyere, tuyere damage or even an explosion of pulverized coal in warm-air pipes, which impacts safe production and the regular functioning of furnaces.

Therefore, the flow parameters of the pulverized coal-air two-phase flow, which flows in a pneumatic conveying pipeline, must be measured to monitor the flow state of the gas-solid two-phase flow in the pneumatic conveying pipeline or to provide alerts of accidents from conveying pulverized coal.

However, due to the non-homogeneous concentration distribution and the complex flow pattern of the gas-solid two-phase flow, parameter measurements for the solid phase is a problem known in the art, which the electrical and metallurgical industries have attempted to address, but have not yet been successful.

At present, there are two main classes of methods for measuring pulverized coal-air flow state, one of which is a contact method. With this method, sensors are directly placed in the pipelines for measurement of a flow field. However, the contact method tends to disturb the flow field, which makes real flow state unavailable and can be a cause of fault. A disadvantage of the contact method is that the sensors are liable to be damaged due to direct erosion by the fluids. The second method is a non-contact method, which includes a temperature difference method and an optical detection method. The principle of the temperature difference method is based on the fact that the temperature of the pulverized coal from the pulverized coal injection system is higher than both the environmental temperature and the temperature of compressed air after dry and cold dehydration. A state diagnosis is then performed according to a variation in the temperature difference before and after pulverized coal is clogged in the pipeline. For this method, summarizing rules for determining temperature difference between pulverized coal and conveying pipeline before and after clogging, and diagnosing a flow state of pulverized coal in an outdoor environment is difficult. Even in an enclosed environment, determining the temperature difference determination rules is difficult. With the optical detection method, an optical detector is equipped in a cone space in front of the watch hole of the tuyere and is used to monitor the state of a blast-furnace tuyere. For this method, in case of a furnace blowing down or tuyere maintenance, the device needs to be removed and mounted, which is inconvenient. Further, the optical detection method requires that the detected area has good light transmittance, which is a challenge for the optical detection method when applied in a high concentration dense coal powder conveying system.

Therefore, measuring flow parameters of a two-phase flow in a convenient and accurate way is a technical difficulty, which needs to be solved urgently.

In production practice, flow parameters of a two-phase flow that need to be measured include a volume concentration of a solid phase, a velocity of the two-phase flow, a mass flow rate and a temperature. To date, the volume concentration of the solid phase, the velocity of the two-phase flow and mass flow rate of a working medium phase are flow parameters that cannot be accurately and reliably measured.

SUMMARY OF THE INVENTION

The above-mentioned problems in the prior art are addressed. An object is to provide a capacitive sensor capable of measuring flow parameters of a two-phase flow, a device for measuring phase concentration of a two-phase flow, and a system and method for measuring flow parameters of a two-phase flow.

According to an embodiment, a capacitive sensor is provided and includes at least one pair of electrodes, which wrap outside the external surface of a dielectric material pipe and twist into a spiral shape in a common direction along a longitudinal direction of the dielectric material pipe.

According to another embodiment, a phase concentration measuring device for a two-phase flow is provided. The phase concentration measuring device includes a pipeline structure section having a dielectric material pipe through which a two-phase flow to be measured can pass and a capacitive sensor of the above-mentioned structure. The dielectric material pipe can be made from a dielectric material.

According to yet another embodiment, a system for measuring flow parameters of a two-phase flow is provided. The system includes a phase concentration sensor and a velocity sensor. The phase concentration sensor includes a dielectric material pipe through which a two-phase flow can pass and at least one pair of electrodes. The dielectric material pipe can be made from a dielectric material. The at least one pair of electrodes can be wrapped outside the external surface of the dielectric material pipe and twisted into a spiral shape in a common direction along a longitudinal direction of the dielectric material pipe.

The velocity sensor includes an upstream capacitive sensor and a downstream capacitive sensor. The upstream capacitive sensor and the downstream capacitive sensor can be identical capacitive sensors and provided at an upstream and downstream side of the at least one pair of electrodes in a common direction along a longitudinal direction of the dielectric material pipe on the external surface.

According to another embodiment, a method for measuring flow parameters of a two-phase flow is provided. The two-phase flow includes a working medium phase and a carrier phase, and flows through a pipeline. The pipeline includes at least one section of a dielectric material pipe formed from a dielectric material. The dielectric material pipe and the pipeline have the same inner diameter. The method includes measuring a volume concentration of the working medium phase in the two-phase flow and a velocity of the two-phase flow with a capacitance method when the two-phase flow flows through the pipeline. The process of measuring the volume concentration of the working medium phase includes twisting at least one pair of electrodes into a spiral shape in a common direction along a longitudinal direction of the dielectric material pipe on the external surface; measuring a capacitance induced on the at least one pair of electrodes when the two-phase flow flows through the dielectric material pipe; calculating the volume concentration of the working medium phase in the two-phase flow according to an expression $C=K\cdot[\in_g+(\in_s-\in_g)\cdot\beta]$. C is a capacitance value measured by the at least one pair of electrodes, K is a characteristic parameter determined by a structure dimension, $\in_s$ and $\in_g$ are dielectric permittivities of the working medium phase and the carrier phase in the two-phase flow respectively, and $\beta$ is the volume concentration of the working medium phase. The process of measuring the velocity of the two-phase flow includes providing identical capacitive sensors in a common direction at an upstream and downstream side of the at least one pair of electrodes along a longitudinal direction and on the external surface of the dielectric material pipe; measuring random time sequence signals induced at the upstream capacitive sensor and the downstream capacitive sensor respectively when the two-phase flow flows through the dielectric material pipe; subjecting the random time sequence signals to correlation analysis and calculating a transition time for the two-phase flow to pass through the upstream and downstream sensors; and calculating the velocity of the two-phase flow according to an expression $v=L/\tau$, where $v$ is the velocity of the two-phase flow, L is a distance between the upstream and downstream sensors, and $\tau$ is the transition time.

According to another embodiment, a plurality of communication modes are provided for flow parameters of a two-phase flow. The plurality of communication modes include outputting analog signals with a current of 4~20 mA; 485 bus serial digital communication; and CAN bus serial digital communication.

According to another embodiment, an auto calibration method for mass flow rate of a two-phase flow is provided. The auto calibration method adjusts the cumulative mass flow rate of the two-phase flow with a cumulative mass flow rate signal of a weighing system.

Accordingly, as described above, by using the capacitive sensor of the above-mentioned structure, the phase concentration measuring device for a two-phase flow with the capacitive sensor structure, and the system for measuring flow parameters of a two-phase flow, dynamic parameters of a gas-solid two-phase flow can be measured accurately.

DETAILED DESCRIPTION OF THE INVENTION

Generally, two-phase flows used in industrial production practice include a carrier phase serving as a carrier, such as the air in the above-mentioned pulverized coal-air two-phase flow, and a working medium phase serving as a working medium, such as the pulverized coal in the above-mentioned pulverized coal-air two-phase flow. In the gas-solid two-phase flow, the solid phase is the working medium phase, and the gas phase is the carrier phase.

The method for measuring the solid phase concentration, velocity and mass flow rate of a two-phase flow will be described below.

Concentration of Solid Phase (Working Medium Phase)

For the fundamental test theory, a capacitive method is applied to measure the volume concentration of a working medium phase (solid phase) in a flow of two phases with different dielectric permittivity. When a gas-solid two-phase flow of different dielectric permittivities passes through a measuring field formed among electrodes of a phase concentration sensor, variation of the solid phase concentration causes a change of the effective dielectric permittivity of the two-phase flow, and thus, the change of capacitance output value of the phase concentration sensor. The magnitude of the capacitance value can serve as a measurement of the solid phase concentration of the two-phase flow.

However, in many practical applications of two-phase flows, such as those in the electrical and metallurgical industries as mentioned above, the solid phase (working medium phase) is not distributed homogeneously in the gas phase (carrier phase), and the flow pattern is extremely complex. The relationship between the capacitance measurements and the solid phase concentrations is not a linear relationship of one-to-one correspondence. Furthermore, a capacitive sensor itself suffers a non-homogeneous sensitivity distribution of the intrinsic measuring field, which can lead to severe measurement error when the flow pattern varies. Therefore, measuring a solid phase concentration of a two-phase flow with a traditional capacitive sensor structure directly in production practice is not possible.

Figure 1:
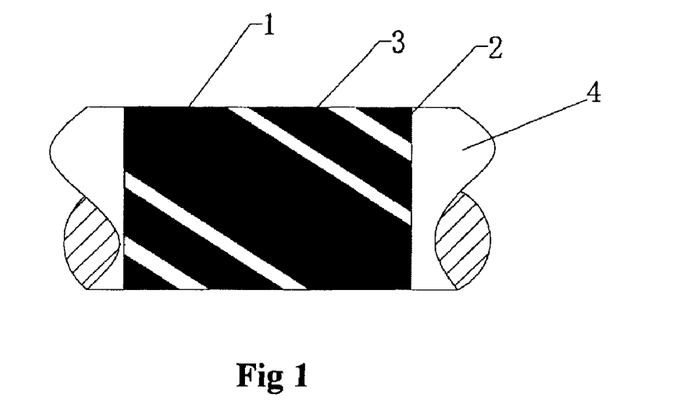
FIG. 1 is a schematic diagram of a capacitive solid phase concentration sensor, according to one embodiment.
Figure 2:
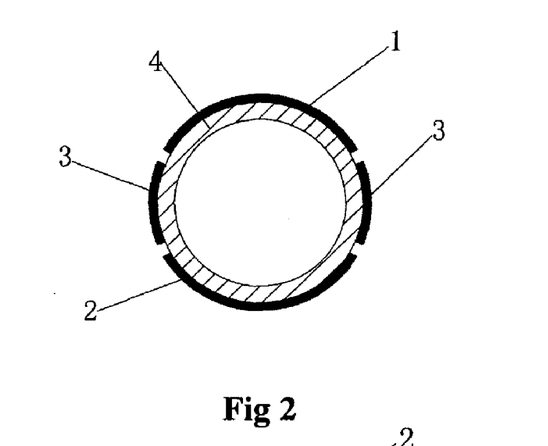
FIG. 2 is a left side view of the capacitive solid phase concentration sensor of FIG. 1.
Figure 3:
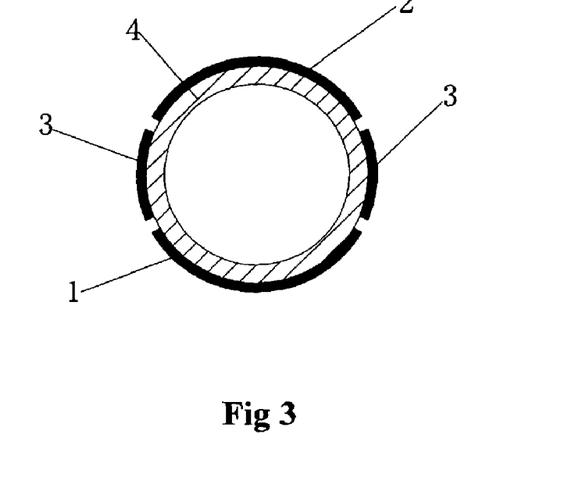
FIG. 3 is a right side view of the capacitive solid phase concentration sensor of FIG. 1.
Figure 4:
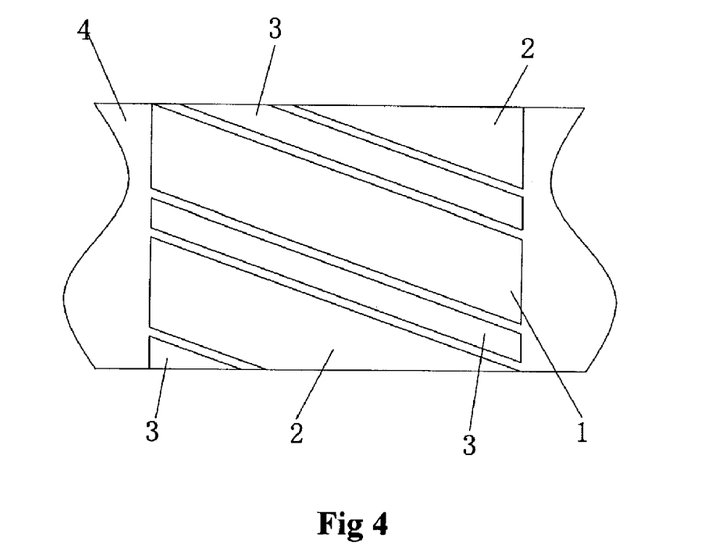
FIG. 4 is an expanded schematic diagram of the capacitive sensor shown in FIG. 1.

FIGS. 1~4 illustrate schematic diagrams of the capacitive phase concentration sensor, where FIG. 1 is a front view, FIG. 2 is a left view, FIG. 3 is a right view, and FIG. 4 is an expanded view.

The phase concentration sensor includes surface electrodes of a spiral shape, including at least one pair of electrodes having a source electrode 1 and a measuring electrode 2. The at least one pair of electrodes are twisted into a spiral shape in a common direction. To overcome a soft field effect, a strip-shaped edge guard electrode 3 is formed between adjacent edges of the source electrode 1 and the measuring electrode 2 and is twisted into a spiral shape in the common direction as that of the source electrode 1 and the measuring electrode 2.

As shown in FIGS. 1-3, the phase concentration sensor includes four electrodes: a source electrode 1, a measuring electrode 2 and two symmetrical edge guard electrodes 3, all of which are twisted by 180° along the longitudinal direction of the dielectric material pipe 4.

Due to the twisted electrodes, the electric detection field formed by the source electrode, the measuring electrode and the two edge guard electrodes of the sensor are also twisted by 180° along the direction of the dielectric material pipe. This makes the capacitance output characteristics of the phase concentration sensor differ from conventional capacitive sensors with straight surface electrodes. The sensitivity distribution characteristics also change significantly. By redesigning the electrode shape, namely by applying source and measuring electrodes of a spiral shape, instead of straight surface electrodes used by traditional capacitive sensors, the uniformity of the measuring field is enhanced, dependency on the flow pattern is reduced, and the capacitance measurements only relate to the solid phase concentration but independent of the spatial distribution in the acceptable error range. This allows concentration measurement of a two-phase flow with a capacitance method. The use of the edge guard electrodes enable the phase concentration sensor to further overcome the soft field effect produced upon measuring of an electrical field, which further improves the measurement accuracy and reliability of the phase concentration sensor.

Figure 5:
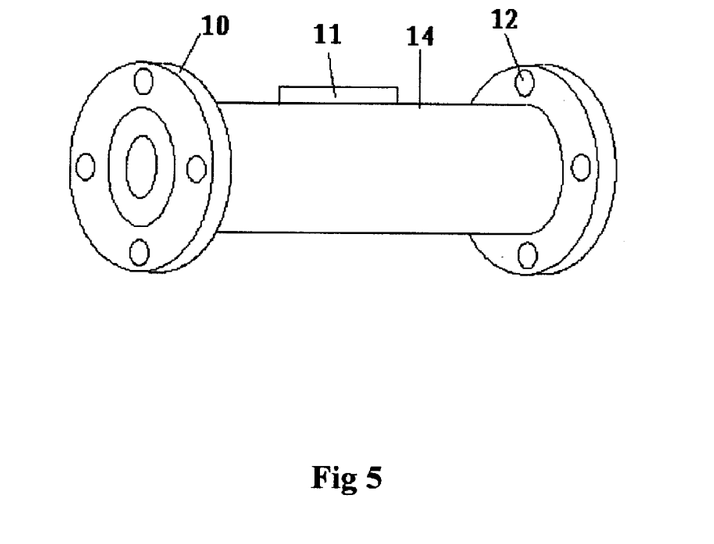
FIG. 5 is a perspective schematic diagram of a phase concentration measuring device for a two-phase flow, according to one embodiment.
Figure 6:
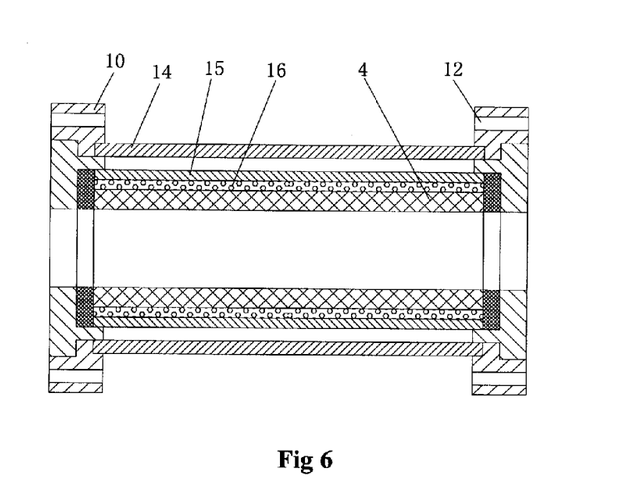
FIG. 6 is a longitudinal sectional view of the solid phase concentration sensor of FIG. 5.

FIG. 5 is a perspective view of one embodiment of a phase concentration measuring device for a two-phase flow. FIG. 6 is a longitudinal sectional view of the phase concentration measuring device shown in FIG. 5. For clarity, the electrodes are not shown in FIG. 6. The measuring device includes the above-mentioned capacitive sensor.

During use, the phase concentration measuring device for a two-phase flow can, for example, be a section of a pipeline in which the two-phase flow is to be detected, such as the above-mentioned pipeline for pneumatic transmission conveying of pulverized coal. The phase concentration measuring device can be hermetically combined with the two-phase pipeline.

As shown in FIGS. 5 and 6, the phase concentration measuring device for a two-phase flow includes a pipeline structure section and connecting structure sections provided at both ends of the pipeline structure section.

The pipeline structure section includes the above-mentioned dielectric material pipe 4 and the above-mentioned capacitive sensor wrapped outside the external surface of the dielectric material pipe 4.

The dielectric material pipe 4 has the same inner diameter as that of the conveying pipeline for the two-phase flow to be detected. Like the two-phase pipeline, the measuring device operates to convey a two-phase flow after being connected into the pipeline. As understood by those skilled in the art, specific requirements for the dielectric material pipe 4 can vary depending on different operation conditions. For example, for situations of pneumatic conveying of pulverized coal in the electrical and metallurgical industries, the dielectric material pipe is required to be resistant to wear, to have good uniformity in all directions, tolerance to withstand pressure and a degree of inner smoothness. Therefore, alumina, quartz and ceramics can be used, for example.

The source electrode 1, the measuring electrode 2 and the edge guard electrode 3 of the capacitive sensor can use electrode materials for traditional capacitive sensors, such as copper. Copper sheet or copper foil of adequate thickness can be cut into a desired shape and then wrapped around the external surface of the dielectric material pipe 4. Alternatively, processes, such as thin film sputtering can be used to form electrodes on the external surface of the dielectric material pipe 4. Forming electrodes on the external surface of a dielectric material pipe 4 is a well-known technique, and therefore will not be further described here.

A screen shield 15 provides the electromagnetic environment required for the capacitive sensor to operate normally. Therefore, the screen shield should be made of materials capable of preventing electromagnetic interference, such as stainless steel tubes. As stated above, the capacitance method can be applied for measuring a two-phase flow by redesigning the shape of electrodes. Therefore, as understood by those skilled in the art, the method does not rely on the screen shield. As long as specific materials or structures for the screen shield 15 are selected as known in the art, the screen shield can be incorporated into the measuring device.

Air can be located between the screen shield 15 and the dielectric material pipe 4. To prevent movement of the electrode position during handling and mounting (especially in a case where the electrodes are wrapped manually), a filler 16 can be used to fill between the screen shield 15 and the dielectric material pipe 4. The filler 16 can be an epoxy resin or other similar materials.

In addition, in practical environments, such as steel works and power plants, working conditions can sometimes be very poor. Here, a protecting tube 14 that can effectively withstand severe working conditions is required. Any materials commonly used by those skilled in the art can be used for the protecting tube 14, either metal or nonmetal, as long as the material can provide protection. However, the protecting tube 14 is not necessary. In certain cases, the screen shield 15 itself can serve as the protecting tube.

In the embodiment shown in FIGS. 5 and 6, the connecting structure section includes flanges 10 formed at both ends of the above-mentioned pipe structure section, on which connecting holes 12 are formed. The flanges 10 and connecting holes 12 are connected with the flanges, and connecting holes or pieces provided on a pipeline for the two-phase flow to be detected, so as to construct a complete two-phase flow conveying passage with the phase concentration measuring device and the two-phase flow pipeline. Tightly connecting two pipe fittings with a flanged connection is well known, and therefore is not described in detail herein.

The measuring device further includes a wiring slot 11 formed on the external surface of the pipe structure section for communicating with inner electrodes to measure capacitance generated by the capacitive sensor. The wiring slot 11 can be connected to any microprocessor, industrial controller or computer (not shown) with computational functions, so as to calculate the volume concentration of the working medium phase according to the detected capacitance.

The phase concentration can be optimized in design with a finite element numerical method.

Since the phase concentration sensor uses an excitation voltage with a frequency of a few KHz to a few MHz, the sensitive field of the phase concentration sensor can be considered an electrostatic field. When ignoring the edge effect resulting from the axial length of electrodes, this electrostatic field can be simplified as a two-dimensional field for processing.

Specifically, the output capacitance of the phase concentration sensor is obtained as follows. The pair of spiral electrodes 1 and 2 are divided into a number of micro-units along the cross section direction of a two-phase flow pipeline (a dielectric material pipe). The total capacitance value between the two spiral surface electrodes 1 and 2 (the capacitance between the measuring electrode 2 and the source electrode 1) of the capacitive phase concentration sensor can be obtained by adding together the capacitances of all micro-units.

In the phase concentration sensor, variation of a dielectric pemittivity of the media in any subregion in the detection region can lead to variation of the capacitance value between the electrodes, which is the basis for measurement by the phase concentration sensor. In one embodiment, the object of optimizing a design is to ensure the measurement of concentration for a working medium phase (solid phase concentration) is not influenced by flow pattern variation and phase distribution variation. In other words, throughout the detection field, the output changes of the sensor caused by a concentration increment generated in micro-units with equal volume is equal or tends to be equal. That is, given that the sensitivity requirement of the phase concentration sensor is met, the uniformity error is minimized as far as possible.

Assume that the entire measuring field is divided into M units. The relative sensitivity of a sensor ($S_{\in, avg}$) means the average value of relative sensitivities of units in the measuring field, which is a normalized value defined as:

$$S_{\varepsilon,avg} = \frac{1}{M}\sum_{j=1}^{M} S_{\varepsilon,j}$$

$S_{\in,j}$ is the relative sensitivity of a unit when the dielectric permittivity of one unit thereof ($\in_0 \to \in$) is changed and the dielectric permittivity of other units remains constant ($\in 0$), as defined below:

$$S_{\varepsilon,j} = \frac{(C_{\varepsilon,j} - C_0)/C_0}{\beta_j}$$

where $C_0$ is the standing-capacitance value for empty pipe; $C_{\in,j}$ is the absolute capacitance value of the $j^{th}$ unit filled with solid phase (working medium phase) (j=1, 2, ... M); and $\beta_j$ is the volume concentration of the $j^{th}$ unit.

According to the definition of standard deviation and rate of change in statistics analysis, the uniformity error parameter (SVP) of measuring field is defined as:

$$SVP = \frac{S_{\varepsilon,dev}}{S_{\varepsilon,avg}} \cdot 100\%$$

where $S_{\in,dev}$ is the standard deviation of relative sensitivities of units in the measuring field with mathematical expression of $$S_{\varepsilon,dev} = \left(\frac{1}{M}\sum_{j=1}^{M}(S_{\varepsilon,j} - S_{\varepsilon,avg})^2\right)^{1/2}$$

The smaller the SVP value, namely, the smaller the uniformity error, the more uniform the distribution of detection sensitivities of the capacitive phase concentration sensor and the smaller the measurement error of the sensor.

As theoretical analysis and experiment indicate, when measuring a solid phase concentration of a gas-solid two-phase flow with the phase concentration sensor and the phase concentration measuring device, the uniformity error can be as small as 3.9%. The uniformity error can be as high as 40% if a traditional straight plate capacitor is used. Therefore, the phase concentration sensor and the phase concentration measuring device effectively address non-homogeneous distribution of sensitivities of a measuring field and can also effectively address the soft field effect, thereby measuring volume concentration parameters reliably and accurately.

Velocity of Solid Phase (Working Medium Phase)

Figure 7A:
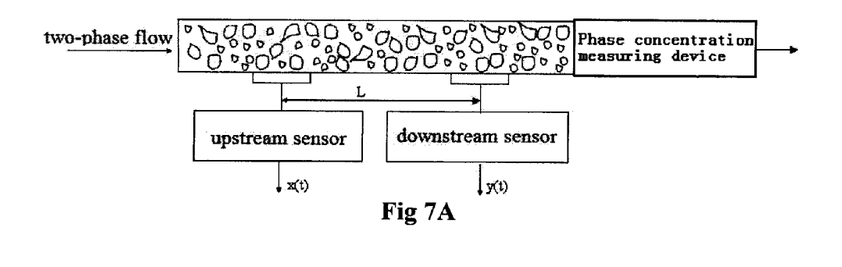
FIG. 7A is a schematic diagram for a system for measuring flow parameters of a two-phase flow according to the present invention, which comprises a phase concentration measuring device and a velocity sensor, the velocity sensor measures velocity of a two-phase flow with a correlation method.
Figure 7B:
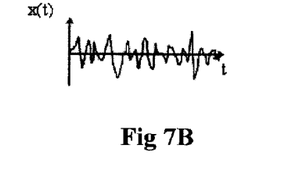
FIGS. 7B and 7C are schematic diagrams of time sequence signals induced in an upstream sensor and a downstream sensor when the two-phase flow passes by the sensors.
Figure 7C:
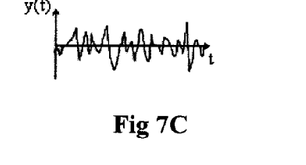

FIG. 7A is a schematic diagram for a system for measuring flow parameters of a two-phase flow according to the present invention, which comprises a phase concentration measuring device and a velocity sensor, the velocity sensor measures velocity of a two-phase flow with a correlation method. FIGS. 7B and 7C are schematic diagrams of time sequence signals induced in an upstream sensor and a downstream sensor when the two-phase flow passes by the sensors.

A velocity sensor for measuring velocity of a two-phase flow includes identical upstream and downstream sensors, which can be capable of inducing time sequence signals when the two-phase flow passes by the sensors.

If the pipeline space between the upstream and downstream sensors is considered as a process system, the output signal X(t) of the upstream sensor can be considered as a system input, and the output signal Y(t) of the downstream sensor can be considered as a system output. For a stationary flow state, the unit pulse response of the system is independent of time, as provided below:

$$y(t) = \int_0^\infty h(t)X(t-\alpha)d_\alpha + n(t) \quad (1)$$

where h(t) is the unit pulse response of the system and n(t) is the noise in Y(t) that is independent of X(t).

By definition, the cross-correlation function of upstream and downstream flow noise signals is:

$$R_{xy}(\tau) = \lim_{T\to\infty}\frac{1}{T}\int_0^T X(t-\tau)Y(t)d_t + n(t)f \quad (2)$$

Substituting expression (1) into (2), provides the following:

$$R_{xy}(\tau) = \int_0^T h(\alpha) R_{xx}(\tau - \alpha) Y(t) d\alpha + R_{xn}(\tau) \quad (3)$$

Since X(t) is independent of n(t), when the integral time is long enough, $R_{xn}(\tau)$ trends towards zero. Thus, expression (3) becomes:

$$R_{xy}(\tau) = \int_0^\infty h(\alpha) R_{xx}(\tau - \alpha) d\alpha \quad (4)$$

If the detected flow satisfies the "frozen pattern" assumption proposed by Taylor, the system is a linear system, and the pulse response is only a delayed unit pulse, which is determined as follows:

$$h(\alpha) = \delta(\tau - \tau_0) \quad (5)$$

where $\tau_0 = L/v$ is the transition time for the solid phase particles clustering to pass through the distance between two sensors. Substituting expression (5) into (4), provides the following:

$$R_{xy}(\tau) = R_{xx}(\tau - \tau_0) \quad (6)$$

Such a cross-correlation function equals the auto-correlation function of the system input signal X(t) delayed by $\tau_0$. According to the theory of random processes, the value of an auto-correlation function at $R_{xx}(0)$ is the maximum. Therefore, when $\tau = \tau_0$, the cross-correlation function is the maximum. With this principle, according to the peak value of the cross-correlation function, the transition time $\tau_0$ of the two phase flow can be determined, and thus, the velocity of the fluid can be calculated as $v = L/\tau_0$.

System for Measuring Flow Parameters of a Two-Phase Flow

Figure 8:
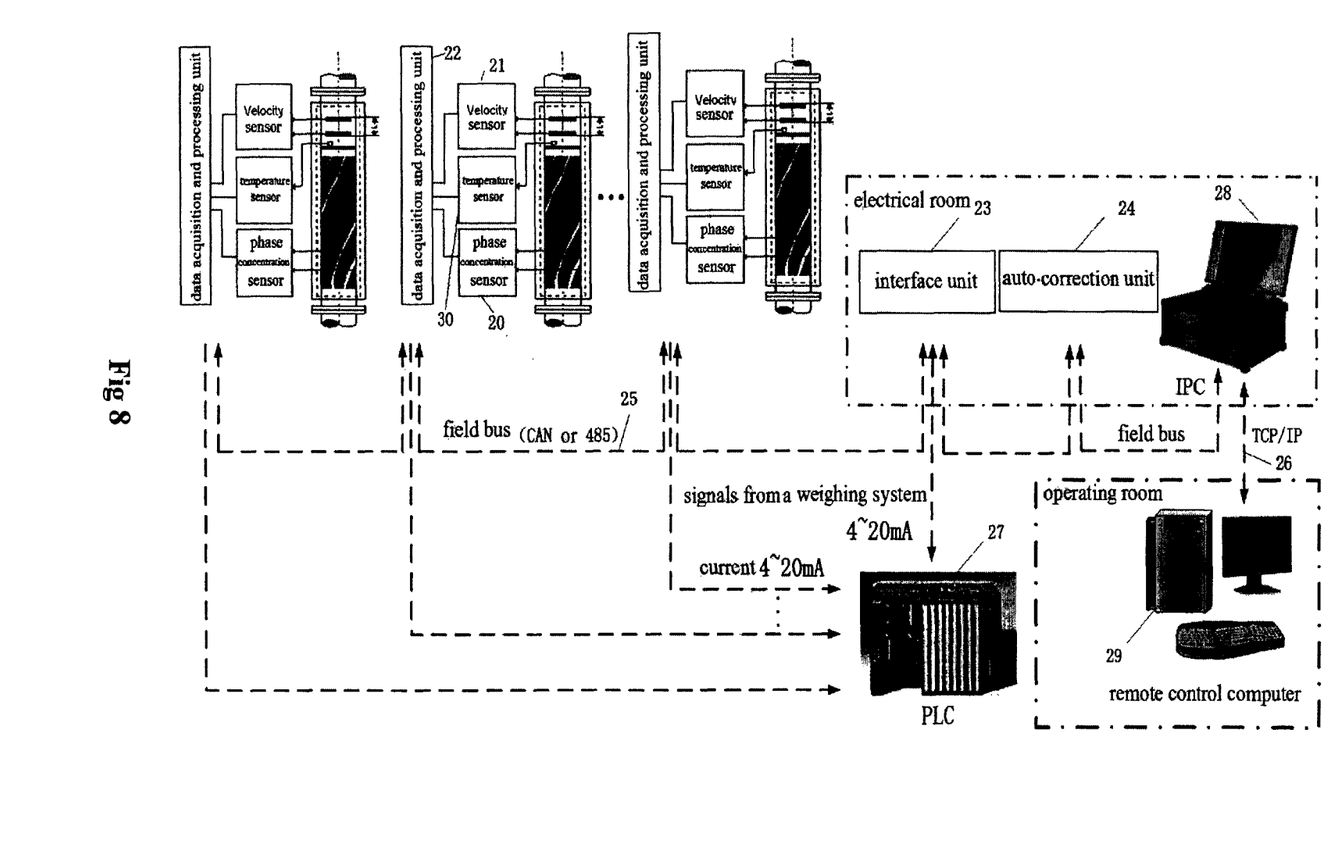
FIG. 8 is a schematic diagram showing a flow parameter measuring system for a two-phase flow, according to one embodiment.

FIG. 8 is a schematic diagram of a flow parameter measuring system of a two-phase flow, according to one embodiment. The phase concentration sensor 20 for measuring solid phase concentration can be connected into a pipeline for a two-phase flow and becomes a part of the pipeline. The velocity sensor 21 for measuring velocity of a two-phase flow can be placed along the longitudinal direction of the pipeline for the two-phase flow (i.e. the direction of flow for the two-phase flow), either upstream or downstream with respect to the phase concentration sensor 20. The structure and principle of the phase concentration sensor 20 and the velocity sensor 21 are further described above, and will not be further described here.

Electronic signals output by the phase concentration sensor 20 and the velocity sensor 21 can be acquired by a data acquisition and processing unit 22. The concentration and velocity of a fluid are calculated with the method described above, and the mass flow rate of the working medium phase is calculated according to an expression $Q = A\rho v \cdot \beta$, where $\beta$ is the volume concentration, v is the velocity, $\rho$ is the real density of the working medium phase, and A is the cross-sectional area of the pipeline for the two-phase flow. In the embodiment shown in FIG. 8, a data acquisition and processing unit 22 can output analog signals with a current of 4~20 mA or can transmit the signals to an interface unit 23 of the electrical room via a CAN (or 485) bus 25. After signal conversion by the interface unit, the signal is transmitted to an auto-calibration unit 24 via a CAN bus. The auto-calibration unit 24 adjusts the mass flow rate of the working medium phase according to the weighing signal and other related data from a PLC 27. Data adjusted by the auto-calibration unit 24 and other related data are transmitted to an industrial process control computer (IPC) in the electrical room for data analysis, fault diagnosis and function display. Data of the IPC can be transmitted to a remotely controlled computer 29 of the operating room via a ICP/IP protocol 26, for participating in remote control of the data.

In the embodiment shown in FIG. 8, a temperature sensor 30 is also included to measure temperature parameters. The temperature parameters can be determined using schemes known in the art, and will not be described in detail here.

Figure 9A:
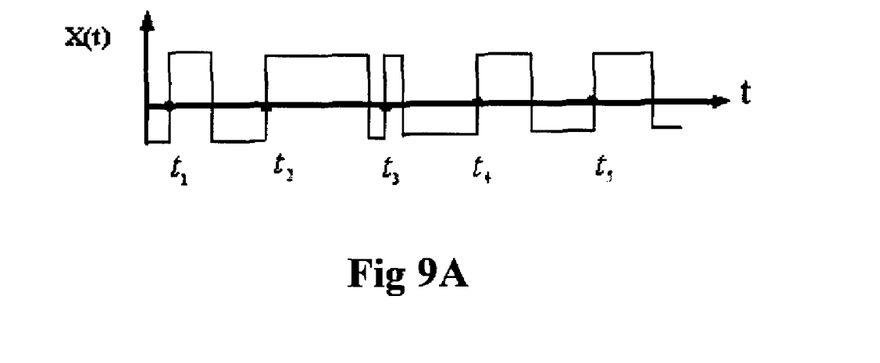
FIGS. 9A and 9B are schematic diagrams showing the time sequence signals shown in FIGS. 7B and 7C, as converted into a pulse sequence with randomly varied widths after passing through a zero crossing detecting circuit.
Figure 9B:
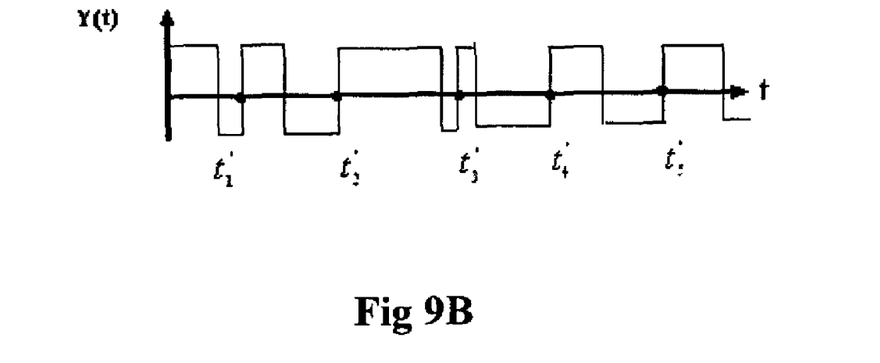

According to an embodiment, random signals output from the upstream and downstream sensors are converted by a zero crossing measuring circuit into a pulse sequence with randomly varied widths, as shown in FIGS. 9A and 9B. Since a zero crossing pulse sequence is a random time sequence, the zero crossing pulse sequence can be considered as pulses with different widths, which can only occur once during a finite measuring time and will not appear repeatedly. Also, since there is a corresponding relationship between the upstream and downstream zero crossing pulse sequence, for a certain upstream pulse, if a pulse with the same width can be found at the downstream, the pulse and the corresponding upstream pulse are determined to be generated by the same fluid cluster. Therefore, the following condition can be used as a condition for identifying the same fluid cluster: $(t_j - t_i) - (t_n - t_m) = 0$. In the expression, $t_j$ and $t_i$ are two adjacent timings of low-to-high jumping in the upstream zero crossing pulse sequence respectively with a corresponding pulse of $X_i$, and $t_n$ and $t_m$ are two adjacent timings of low-to-high jumping in the downstream zero crossing pulse sequence with a corresponding pulse of $Y_m$. If the above condition is satisfied, $Y_m$ and $X_i$ are determined to be generated by the same fluid cluster. Then the transition time $\tau_0$ is: $\tau_0 = t_m - t_i = t_n - t_j$. Thus, the velocity of two-phase flow is calculated as $v = L/\tau_0$, where L is the longitudinal length between the upstream and downstream sensors in the velocity sensor.

While the principle and specific implementations of the invention have been described with respect to a gas-solid two-phase flow, those skilled in the art can make various improvements and modifications on the basis of the above-mentioned embodiments that fall within the protection scope of the invention. Those skilled in the art should understand that the above specific description is only for purposes of explanation and do not limit the invention. The protection scope of the invention is defined by the claims and their equivalents.

What is claimed is:

1. A capacitive sensor comprising:
    a dielectric material pipe; and
    at least one pair of electrodes wrapped outside an external surface of the dielectric material pipe and twisted into a spiral shape in a common direction along a longitudinal direction of the dielectric material pipe,
    wherein the at least one pair of electrodes are twisted by 180°.

2. A capacitive sensor according to claim 1, wherein the capacitive sensor is used in a pipeline structure section of a phase concentration measuring device.

3. A capacitive sensor according to claim 2, wherein a connecting structure provided on at least one end of the pipeline structure section hermetically connects the phase concentration measuring device with the capacitive sensor to a pipeline for the two-phase flow to be detected.

4. A capacitive sensor according to claim 3, further comprising:
  at least one edge guard electrode having a strip shape and located between adjacent electrode edges of the at least one pair of electrodes, wherein the edge guard electrode is wrapped outside the external surface of the dielectric material pipe and twisted into a spiral shape in a common direction of the at least one pair of electrodes.

5. A capacitive sensor according to claim 2, wherein the pipeline structure section comprises a screen shield to enclose the dielectric material pipe and the capacitive sensor, wherein the screen shield is made of a material capable of resisting electromagnetic interference, a filler located between the screen shield and the dielectric material pipe, and a protecting tube to surround the screen shield.

6. A system for measuring flow parameters of a two-phase flow, comprising:
  a phase concentration sensor, comprising:
    a dielectric material pipe comprising a dielectric material through which a two-phase flow passes; and
    at least one pair of electrodes wrapped outside an external surface of the dielectric material pipe and twisted into a spiral shape in a common direction by 180° along a longitudinal direction of the dielectric material pipe; and
  a velocity sensor, comprising:
    an upstream capacitive sensor; and
    a downstream capacitive sensor,
    wherein the upstream capacitive sensor and the downstream capacitive sensor are identical and the velocity sensor is provided along the longitudinal direction of the pipe for the two-phase flow either upstream or downstream with respect to the phase concentration sensor.

7. A system according to claim 6, wherein the phase concentration sensor further comprises:
  at least one edge guard electrode comprising a strip shape and located between adjacent electrode edges of the at least one pair of electrodes, wherein the edge guard electrode is wrapped outside the external surface of the dielectric material pipe and twisted into a spiral shape in the common direction of the at least one pair of electrodes.

8. A system according to claim 6, wherein the upstream capacitive sensor and the downstream capacitive sensor of the velocity sensor are an array of capacitive sensors aligned in a same manner.

9. A system according to claim 8, further comprising:
  a data acquisition and processing unit configured to receive signals from the phase concentration sensor and the velocity sensor, to calculate concentration of a working medium phase in the two-phase flow, velocity of the two-phase flow, and a mass flow rate of the two-phase flow, and to output signals; and
  an auto-calibration unit configured to receive the output signals from the data acquisition and processing unit and to calibrate the mass flow rate of the working medium phase.

10. A system according to claim 9, wherein the output signals comprise a current between 4-20 mA.

11. A system according to claim 9, wherein the output signals are transmitted via at least one of a CAN bus or a 485 bus.

12. A system according to claim 9, further comprising:
  a programmable logic controller ("PLC") to receive signals from the data acquisition and processing unit, wherein the PLC is located in an electrical room.

13. A method for measuring flow parameters of a two-phase flow, comprising:
  measuring volume concentration of a working medium phase in a two-phase flow through a pipeline comprising:
    measuring a capacitance induced on at least one pair of electrodes twisted and located on an external surface of a dielectric material pipe that is connected to the pipeline when the two-phase flow flows through the dielectric material pipe; and
    calculating the volume concentration of the working medium phase according to an expression $C = K \cdot [\epsilon_g + (\epsilon_s - \epsilon_g) \cdot \beta]$, wherein C is the capacitance value measured by the at least one pair of electrodes, K is a characteristic parameter determined by a structure dimension, $\epsilon_s$ and $\epsilon_g$ are dielectric permittivities of the working medium phase and a carrier phase in the two-phase flow respectively, and $\beta$ is the volume concentration of the working medium phase; and
  measuring a velocity of the two-phase flow comprising:
    providing identical upstream and downstream capacitive sensors in a common direction at either upstream or downstream sides of the at least one pair of electrodes;
    measuring random time sequence signals induced at the upstream capacitive sensor and the downstream capacitive sensor respectively when the two-phase flow flows through the dielectric material pipe;
    correlating the random time sequence signals and calculating a transition time for the two-phase flow to pass through the upstream and downstream sensors; and
    calculating the velocity of the two-phase flow according to an expression $v = L/\tau$, wherein $v$ is the velocity of the two-phase flow, L is a distance between the upstream and downstream sensors, and $\tau$ is the transition time.

14. A method according to claim 13, further comprising:
  after obtaining the random time sequence signals at the upstream and downstream sensors, converting the random time sequence signals into pulse sequence signals with randomly varied widths by passing the random time sequence signals through a zero crossing detecting circuit and calculating the transition time in accordance with the expression: $\tau = (\tau_1 + \tau_2)/2$, wherein $\tau_1 = t_m - t_i$, $\tau_2 = t_n - t_j$, $t_j$, $t_i$ are two adjacent timings of low-to-high jumping in an upstream zero crossing pulse sequence respectively; $t_n$, $t_m$ are two adjacent timings of low-to-high jumping in a downstream zero crossing pulse sequence respectively; and $(t_j - t_i) - (t_n - t_m) < \pm \Delta$, $\pm \Delta I$ is two times the maximum absolute error of the system measurement.

15. A method according to claim 14, further comprising:
  calculating the mass flow rate of the two-phase flow according to an expression $Q = A \cdot \rho \cdot v \cdot \beta$, wherein Q is the mass flow rate of the two-phase flow, A is a cross-sectional area of the pipeline for the two-phase flow, and $\rho$ is a real density of the working medium phase.

16. A method according to claim 13, further comprising:
  calculating the mass flow rate of the two-phase flow according to an expression $Q = A \cdot \rho \cdot v \cdot \beta$, wherein Q is the mass flow rate of the two-phase flow, A is a cross-sectional area of the pipeline for the two-phase flow, and $\rho$ is a real density of the working medium phase.

17. A method according to claim 13, wherein the at least one pair of electrodes is twisted into a spiral shape in a common direction along a longitudinal direction of the dielectric material pipe.

18. A method according to claim 13, wherein the dielectric material pipe and the pipeline have a same inner diameter.

* * * * *